J. ROOT.
Farm Gate.
No. 81,820.
Patented Sept. 1, 1868.
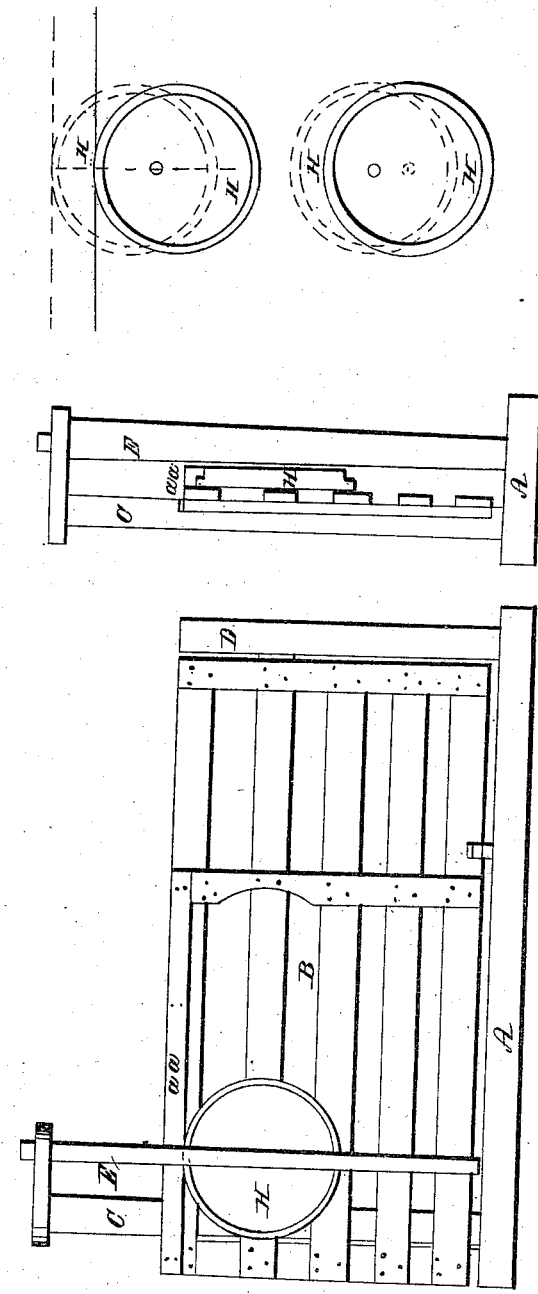
WITNESSES:
INVENTOR:

United States Patent Office.

JOHN ROOT, OF CASS COUNTY, MICHIGAN.

Letters Patent No. 81,820, dated September 1, 1868.

IMPROVEMENT IN FARM-GATES.

*The Schedule referred to in these Letters Patent and making part of the same.*

TO ALL WHOM IT MAY CONCERN:

Be it known that I, JOHN ROOT, in the county of Cass, and State of Michigan, have invented certain new and useful Improvements in "Farm-Gates;" and do hereby declare that the following is a full, clear, and exact description thereof, reference being had to the accompanying drawings, and to the letters of reference marked thereon.

In the annexed drawings, making a part of this specification—

A represents a platform, which it is not necessary to have, but which I may employ.

B represents a gate, which may be made in any of the known and usual ways in general construction.

C and D represent the gate-posts.

E represents an upright revolving post, which is placed a little in advance of and to one side of the rear post C.

H represents an eccentric-wheel, pivoted to the revolving post E.

$a\ a$ represents a double cleat, fastened to the top of the rear part of the gate. The outside cleat is slightly the widest, forming a rabbet on the under side to receive the rabbeted periphery of the eccentric-wheel H.

The post E has a bearing at its bottom, either in the platform A or its equivalent, and at top in a cross-piece which projects from the top of the post C.

The rear of the gate is placed between the posts C and E, with its double cleat $a\ a$ resting upon the eccentric-wheel H, which is placed with the shortest radius up when the gate is shut, but is of such size that the longest radius of the wheel will be up when the gate is shoved back about one-half of its length, in which position it will nearly balance, and may be swung around to a position at right angles with its shut position, the revolving post E and the eccentric-wheel H turning with the gate.

As the gate is elevated by the action of the eccentric H, when being opened, it has, of course, a downward tendency when being shut, so that it is self-shutting when partly open.

Having thus fully described my invention, what I claim, and desire to secure by Letters Patent, is—

In combination with the sliding gate B, the eccentric-wheel H and revolving post E, all arranged and operating in the manner and for the purpose set forth.

In testimony that I claim the foregoing, I have hereunto set my hand, this 21st day of May, 1868.

JOHN ROOT.

Witnesses:
   S. H. WHEELER,
   R. B. WHEELER.